United States Patent

[11] 3,576,419

[72] Inventor Joseph T. Wallace
 Phoenix, Ariz.
[21] Appl. No. 801,934
[22] Filed Feb. 25, 1969
[45] Patented Apr. 27, 1971
[73] Assignee Motorola, Inc.
 Franklin Park, Ill.

[54] SHUNT STABILIZATION OF WELDER
 4 Claims, 1 Drawing Fig.
[52] U.S. Cl. .................................................. 219/108
[51] Int. Cl. .................................................. B23k 9/10
[50] Field of Search .......................................... 219/108-
 —116

[56] References Cited
UNITED STATES PATENTS
2,238,419 4/1941 Hass .......................... 219/108

Primary Examiner—J. V. Truhe
Assistant Examiner—J. G. Smith
Attorney—Mueller & Aichele ABSTRACT: This invention discloses a resistance welding system involving a power level between 2kw. and 100kw. suitable for use in semiconductor lead welding applications where the total circuit impedance is three or more times that of the weld area and the current is in the range of 2,000 to 15,000 amperes or higher. The welding system features a shunt around the weld area where the shunt resistance is comparable to the resistance of the weld area.

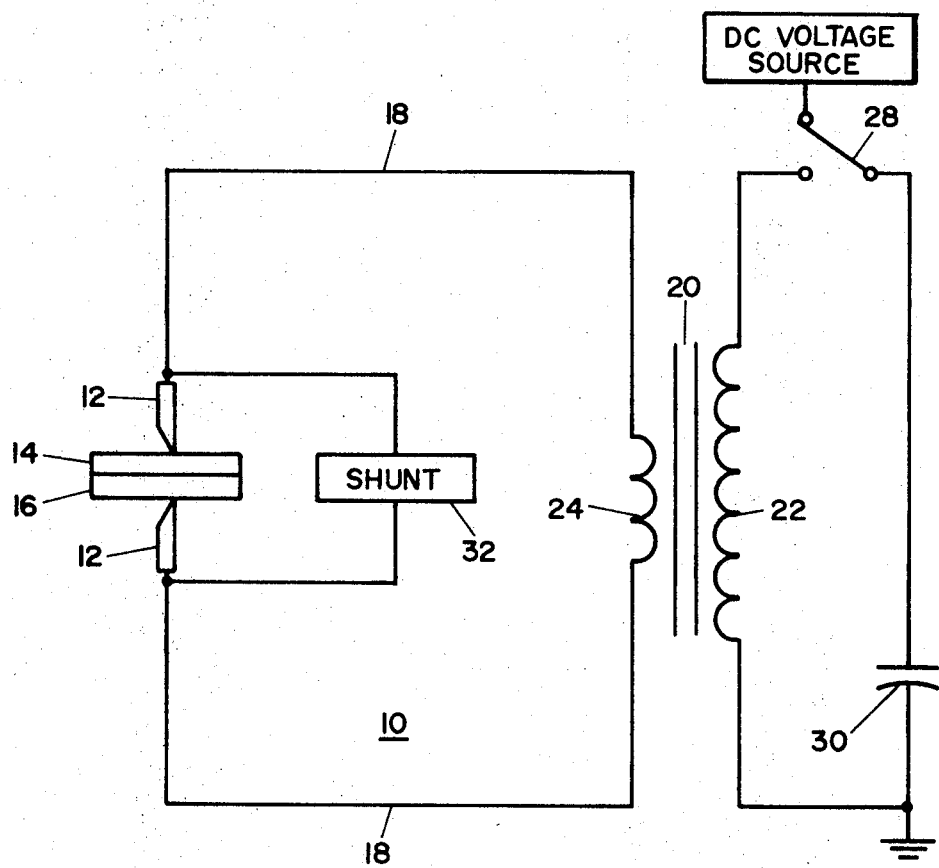

SHUNT STABILIZATION OF WELDER

This invention relates to a welding system and more particularly to a welding system adapted to weld a plurality of low resistance semiconductor leads to a low resistance metal frame member.

The simultaneous welding of a plurality of low resistance leads, for example 14, of a semiconductor device to other low resistance metal leads utilizing commercially available welders results in a number of erratic welds and electrode failures. It is believed that these erratic welds and failures are a result of buildup of aluminum on the welding electrodes or caused by the presence of dirt, epoxy, or other contaminants on the metal leads. The aluminum buildup on the electrodes and/or the presence of dirt or epoxy on the leads increases the resistance of the weld area. When the resistance of the weld area increases, the voltage drop increases correspondingly and as a result, the power or energy in the weld area, being proportional to the voltage in this instance, increases. It is this power or energy increase which causes the erratic welds which take the form of burned up workpieces and electrodes.

It has been widely accepted that the welding current through the workpiece being welded must be accurately controlled during a welding cycle. Welding apparatus of the type disclosed in U.S. Pat. No. 3,275,790 employ a dynamic system involving a power level of less than 2, and a current in the order of 100 to 1,000 amperes. In a dynamic system such as this, the current regulator adjusts the voltage going to the welding electrodes based upon the sensed voltage generated at the welding electrodes. This dynamic system is suitable for welding one or two leads at one time since the current or energy output is relatively low. However, dynamic systems of this type are designed to operate on amperages which are substantially lower, and hence are not suited for high current welding systems which require between 2,000 to 15,000 or more amperes.

Commercially available welders which are capable of supplying an amperage in the range of 2,000 to 15,000 amperes that is necessary to simultaneously weld 10 to 14 leads at one time have a total circuit impedance which is three or more times that of the weld area. In systems of this type involving power levels between 2 and 100, it becomes too expensive to attempt regulation of the weld area voltage by ordinary means such as the type referred to in the aforementioned patent. It is the practice in high power level welding systems of this type to rely upon quality control of the work and electrode surfaces, that is, maintain a substantially constant work area resistance by keeping the work and the electrodes very clean. In the mass production welding of semiconductor leads, it is difficult at best to maintain such rigid control over the cleanliness of the work and electrodes.

It is an object of this invention to provide an improved 2 to 100, power level welding system.

It is another object of this invention to provide a welding system using 2,000 to 15,000 amperes suitable for use in making multiple welds simultaneously.

It is another object of this invention to control the energy through the workpiece during a welding cycle.

It is yet another object of this invention to reduce erratic welds.

It is yet another object of this invention to avoid destruction of the workpiece when the workpiece has a resistance higher than normally encountered.

These and other objects are accomplished by connecting a shunt around the weld area. The resistance of the shunt is similar to or up to twice as great as the resistance of the weld area. In a welding system having a shunt with a resistance similar to the resistance of the weld area and connected thereto, a change in the resistance of the weld area will result in very little change of the weld area energy. For example, an increase of the weld area resistance of 50 percent results in the weld area getting 40 percent of the current instead of the nominal 50 percent, a decrease of 20 percent current. At the same time, the total resistance of the weld area and shunt has increased by 25 percent resulting in a voltage increase of about 22 percent. The energy, which is the product of the current and the voltage, is substantially the same since the lower current and the higher voltage values offset one another. This arrangement permits the weld to be made over a wider range of workpiece resistance.

Other objects and advantages of this invention will be apparent from the following detailed description, reference being made to the accompanying drawings wherein a preferred embodiment of this invention is shown.

Referring to the drawing, the resistance weld system 10 has welding electrode heads 12 in contact with thin metal leads 14 and 16 which are to be welded together. The resistance of the leads 14 and 16 which form the workpiece are of low resistance metals such as aluminum, gold, and the like. Since the workpiece is of low resistance metals, it is difficult to have a work area resistance which approaches one-half or more of the resistance of the secondary circuit, a desirable resistance for efficient use and for control purposes. One of the electrode heads 12 is a cylindrical electrode and the other electrode head is a flat anvil. In the preferred embodiment the cylindrical electrode head comes in physical contact with 14 individual sets of leads which are to be welded. The leads 14 and 16 establish electrical contact between the two electrode heads.

Flexible leads 18 are connected to electrode heads 12. A welding transformer 20 has a primary winding 22 and a secondary winding 24. Leads 18 are connected to the transformer secondary winding 24. Primary winding 22 is connected to a switch 28, a power source, and a capacitor 30.

In accordance with this invention, a shunt 32 is connected to the ends of the weld area, that is, electrode heads 12. The shunt has a resistance which is about the same as the resistance of the work area which includes the electrode heads 12 and the leads 14 and 16. The resistance of the shunt may vary from 0.5 to 2.0 times the resistance of the work area with the preferred shunt resistance being equivalent to the work area resistance.

In a preferred embodiment of this invention, a commercially available welder was used which was capable of providing a current of 12,000 amps. The resistance of the weld area between electrode heads 12 is about 70 microhms. The resistance of the leads 18 and the resistance in the secondary winding of the transformer 24 is about 700 microhms. The resistance of the weld area is about 8 percent of the total resistance in the circuit. In accordance with the practice of this invention, the shunt 32 has a resistance of about 105 microhms. The presence of a shunt prevents the energy or power level from increasing at the electrode heads 12 and in the weld area 14 and 16 when the resistance thereof increases due to aluminum buildup on the electrodes or to dirt or epoxy on the leads 14 and 16. When the weld area resistance increases, the voltage will increase correspondingly but the current will diminish due to the presence of the shunt. As a result, the total power in the weld area, the product of the voltage, and the current will remain fairly constant. The use of a shunt 32 limits the energy across the weld terminals 12 and eliminates catastrophic weld failures.

I claim:

1. A high current resistance welding system having a total circuit impedance which is at least three times that of the weld area under normal preweld conditions comprising a weld area and a shunt, said weld area consisting of a workpiece to be welded, a first electrode in electrical contact with said workpiece, and a second electrode in electrical contact with said workpiece, said shunt connected to said first electrode and to said second electrode and having under normal preweld conditions a resistance equal to 0.5 to 2.0 times the resistance of said weld area.

2. A resistance welding system described in claim 1 wherein the resistance of said shunt is about 1 to 1.5 times the resistance of said weld area.

3. A welding system as described in claim 1 wherein the resistance of said shunt is about 105 microhms and the resistance of said weld area is about 70 microhms.

4. A welding system as described in claim 1 wherein said welding system has a total circuit impedance of from 700 to 800 microhms.